Aug. 13, 1935.  G. H. LELAND  2,011,060

STATOR

Filed Sept. 24, 1934  2 Sheets-Sheet 1

INVENTOR
GEORGE H. LELAND.
by
Edward A. Reed
his ATTORNEY.

Aug. 13, 1935.  G. H. LELAND  2,011,060

STATOR

Filed Sept. 24, 1934  2 Sheets-Sheet 2

INVENTOR.
GEORGE H. LELAND.
by
his ATTORNEY.

Patented Aug. 13, 1935

2,011,060

UNITED STATES PATENT OFFICE 2,011,060

STATOR

George H. Leland, Dayton, Ohio, assignor of one-half to The Leland Electric Company, Dayton, Ohio, a corporation of Ohio Application September 24, 1934, Serial No. 745,301

25 Claims. (Cl. 171—252)

This invention relates to a stator for electrical apparatus and is designed more particularly for use in electric motors.

One object of the invention is to provide a stator of the laminated type which will be simple in construction and can be produced at a low cost.

A further object of the invention is to provide such a stator which can be quickly and easily assembled and in which the several parts will be rigidly held in their assembled positions.

A further object of the invention is to provide such a stator with ventilating passageways through which air may be circulated.

A further object of the invention is to provide a stator which will be of a strong rugged construction.

Other objects of the invention will appear as the device is described in detail.

Figure 1:
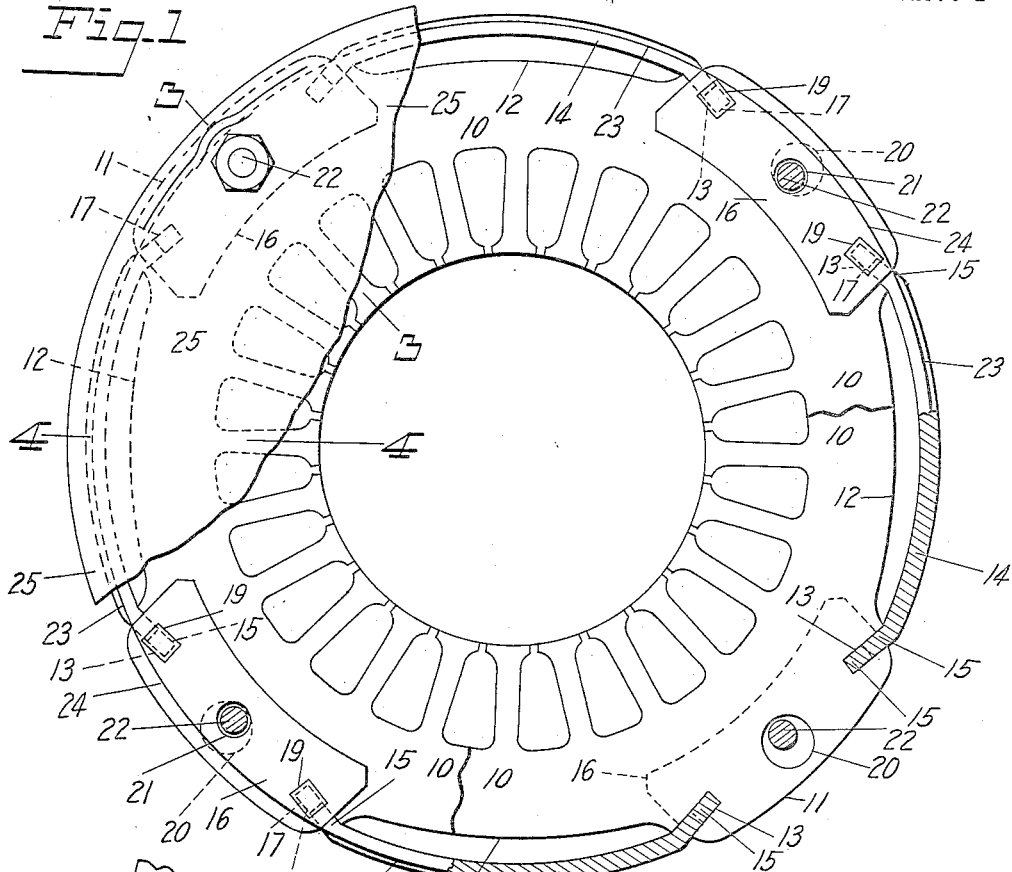
Figure 2:
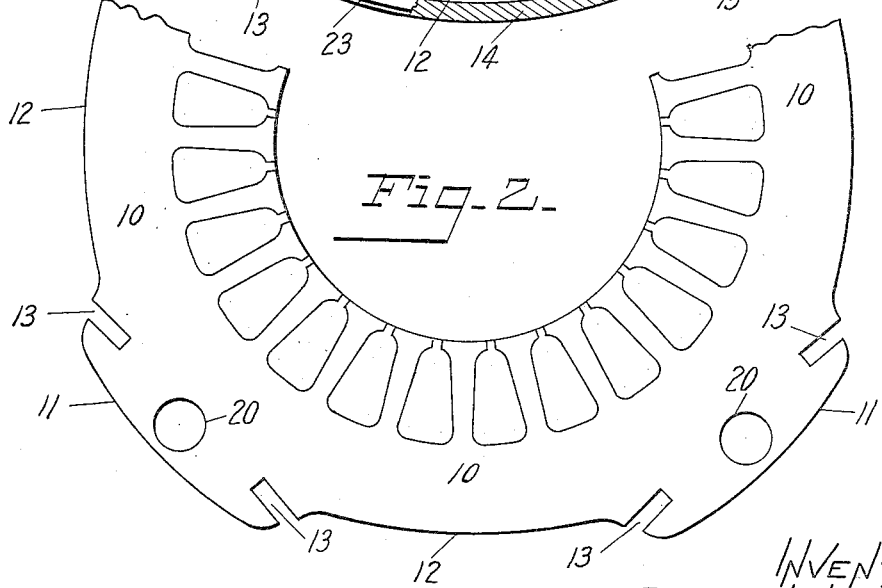
Figure 3:
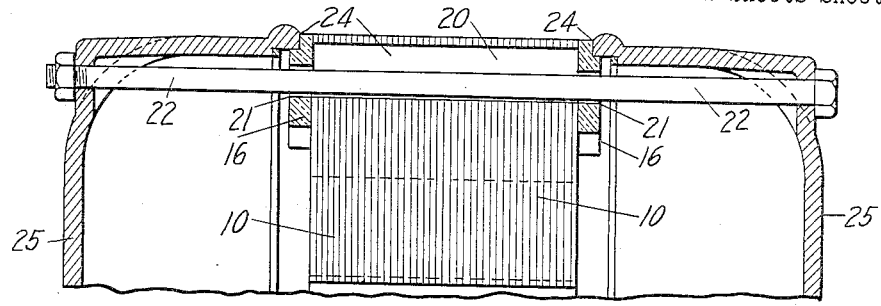
Figure 4:
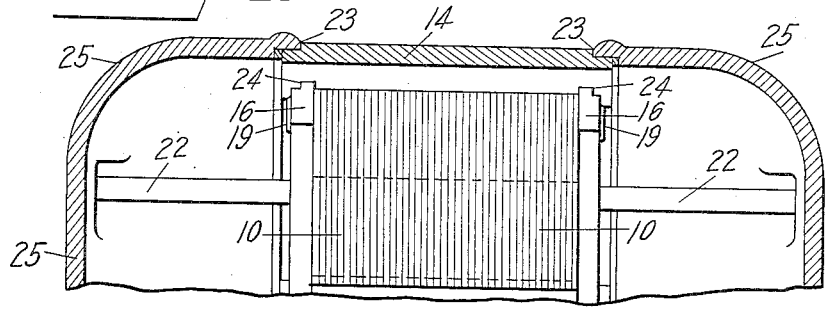
Figure 5:
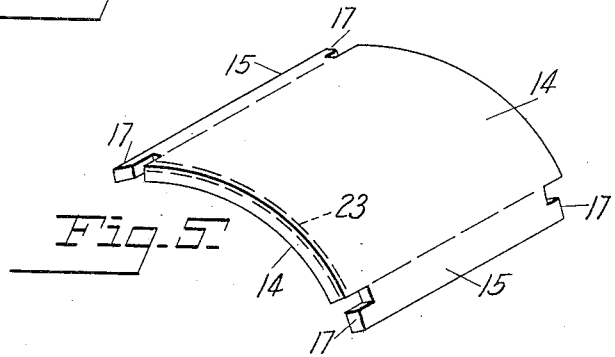
Figure 6:
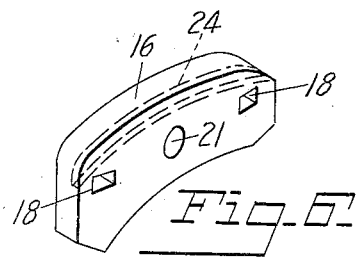

In the accompanying drawings Fig. 1 is an end elevation of a stator embodying my invention, partly in section and showing a portion of one of the end frames; Fig. 2 is a detail view of a portion of one of the laminæ; Fig. 3 is a section taken on the line 3—3 of Fig. 1; Fig. 4 is a section taken on the line 4—4 of Fig. 1; Fig. 5 is a detail view of one of the locking plates; and Fig. 6 is a detail view of one of the side plates.

In these drawings I have illustrated one embodiment of my invention and have shown the same as applied to a stator for a motor of a well known type but it will be understood that the invention may be applied to stators of various kinds and that the several parts thereof may take various forms without departing from the spirit of the invention.

In the particular embodiment here illustrated the stator comprises a plurality of laminæ 10 punched from sheet metal and rigidly connected one to the other. Each lamina of the stator is provided with a plurality of peripheral projections 11 spaced apart circumferentially thereof and separated one from the other by depressions or narrow portions of the lamina, as shown at 12. In the present stator each lamina is provided with four projections spaced equal distances apart, the arrangement being such that the lamina may be punched from sheet metal with a very small waste of stock, thereby enabling it to be produced at a relatively low cost. It will be noted that the shape of the lamina is such that it can be punched from a square sheet of material having a width no greater than the shortest diameter of the laminæ, that is, the diameter through the depressed margins 12. Each projection 11 has at each end thereof a seat, here shown as a slot 13 which is slightly inclined inwardly, the seats or slots in the adjacent ends of the respective projections being thus arranged in opposed relation. The several laminæ are assembled with the corresponding projections 11 thereof in alinement, axially of the stator, and the corresponding notches or seats 13 are thus brought into alinement so as to form continuous recesses extending across the stator.

The several laminæ are held in their proper relative positions by locking members 14 spaced apart circumferentially of the stator, each locking member having its ends firmly connected with the laminæ, as by seating the ends of the locking member in the respective notches or seats 13, thus preventing all circumferential movement of the laminæ with relation one to the other. As here shown, each locking member is arcuate in form and has its end portions 15 bent inwardly to conform to the inclination of the notches 13. The intermediate portions of the locking members are spaced from the adjacent edges of the laminæ so as to provide passageways between the locking members and the laminæ which will permit of the circulation of air to ventilate the windings. When the several laminæ have been placed in proper relative positions the locking plates may be slipped into the corresponding recesses from one side of the stator.

The locking members or plates 14 are held against lateral displacement and the several laminæ held against axial displacement by means of side members or plates 16 arranged on the respective sides of the stator and engaging the outermost laminæ. The side members or plates 16 are arranged in line with the projections 11 of the laminæ and are connected with the adjacent ends of the corresponding locking plates 14. Preferably each end of each locking plate is provided at each side thereof with a laterally extending lug 17, which lugs extend beyond the outermost laminæ on the respective sides of the stator. Each side plate is provided near its ends with openings 18 through which the lugs of the respective locking plates extend and in which these lugs are rigidly secured. In the present instance, the ends of the lugs, after being inserted in the side plates, are upset or riveted to rigidly connect the side members with the locking members, as shown at 19 in Fig. 4. The several parts of the stator may be quickly and easily assembled by placing the laminæ, locking plates and side plates in their proper positions and then inserting the assembled parts in a press which will press the laminæ into firm engagement one with the other and upset the ends of the lugs 17 to rigidly connect the several parts of the stator. The projections 11 of the laminæ and the side plates 16 are provided respectively with openings 20 and 21 to receive the bolts 22 which connect the end frames 25 with the stator. In the present instance, the openings 20 in the laminæ are of a diameter substantially larger than the bolt 22 but this is immaterial as the openings are made large to enable them to receive pilot pins on the punch which forms the laminæ and so far as the construction and operation of the stator is concerned these openings may be just large enough to receive the bolts. It is also desirable that after the several parts of the stator have been rigidly connected the edges of the locking plates and of the side plates should be rabbetted, as shown at 23, and 24, to receive the overlapping edges of the end frames, as shown in Figs. 3 and 4. It will be noted that due to the inclination of the slots 13 the rivet lugs 17 are spaced inwardly beyond the line of the rabbet.

The laminæ are of such shape that they may be punched from sheet metal with very little waste, it being understood that the central opening in each lamina is formed by punching an armature lamina from the blank stock prior to the formation of the stator lamina. The desired number of laminæ may be quickly assembled, with the projections in line, and the locking plates slipped into place. The side plates are then applied and the assembled structure placed in the press and the laminæ pressed into engagement one with the other and the rivet lugs upset to rigidly secure the several parts in their assembled positions. The only machine work necessary is the turning of the rabbets 23 and 24 subsequent to the assembling of the stator. Consequently the stator can be produced at a very low cost and the finished stator is not only highly efficient in operation but is of a very strong rigid character.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In an electrical apparatus, a stator comprising a plurality of laminæ and a plurality of locking members extending circumferentially of said stator and each having its opposite ends arranged transversely to the peripheral edges of said laminæ, the adjacent ends of the several locking members being spaced one from the other and separately connected with said laminæ and forming the sole means for holding said laminæ against circumferential displacement with relation one to the other.

2. In an electrical apparatus, a stator comprising a plurality of laminæ, a plurality of locking members extending circumferentially of said stator and each having its opposite ends arranged transversely to the peripheral edges of said laminæ, the ends of adjacent locking members being spaced one from the other and engaging said laminæ along separated lines to hold the latter against relative circumferential displacement, and connecting members extending between and connected with the separated ends of adjacent locking members.

3. In an electrical apparatus, a stator comprising a plurality of laminæ, a plurality of locking members extending circumferentially of said stator and each having its opposite ends arranged transversely to the peripheral edges of said laminæ, the ends of the several locking members being spaced one from the other and separately engaging said laminæ to hold the latter against relative circumferential displacement and connecting members extending between and connected with said adjacent ends of said locking members, said connecting members having parts engaging the outermost laminæ to hold the several laminæ against relative lateral displacement.

4. In an electrical apparatus, a stator comprising a plurality of laminæ, a plurality of locking members extending circumferentially of said stator, each locking member having opposite edges extending transversely to and connected with the peripheral edges of the several laminæ, and means arranged at the respective sides of said stator to rigidly connect said locking members to said laminæ and to hold said laminæ in firm contact one with the other.

5. In an electrical apparatus, a stator comprising a plurality of laminæ, a plurality of locking members extending circumferentially of said stator, each locking member having opposite edges extending transversely to and connected with the peripheral edges of the several laminæ; side members engaging the outer laminæ at the respective sides of said stator, and means for rigidly connecting said side members with the respective locking members.

6. In an electrical apparatus, a stator comprising a plurality of laminæ, a plurality of locking members extending circumferentially of said stator, each locking member having opposite edges extending transversely to and connected with the peripheral edges of the several laminæ, side members engaging the outer laminæ at the respective sides of said stator, said side members and the respective locking members having interengaging parts to rigidly connect the same one to the other.

7. In an electrical apparatus, a stator comprising a plurality of laminæ, each lamina having a plurality of pairs of opposed peripheral seats, the corresponding seats of the several laminæ being in line one with the other, a plurality of locking members extending circumferentially of said stator, each locking member having its ends arranged transversely to the peripheral edges of said laminæ and engaging the respective seats of one pair of seats, the seats for each locking member being spaced from the seats for the adjacent locking members, and members other than said circumferential members extending between the adjacent pairs of seats and secured to the respective locking members exteriorly of said recesses to connect the latter one to the other and to retain the same in engagement with said seats.

8. In an electrical apparatus, a stator comprising a plurality of laminæ, each lamina having a plurality of pairs of opposed peripheral seats, the corresponding seats of the several laminæ being in line one with the other, a plurality of locking members extending circumferentially of said stator, each locking member having its ends arranged transversely to the peripheral edges of said laminæ and engaging the respective seats of one pair of seats, and other members extending between the adjacent pairs of seats, the last mentioned members and said locking members having interlocking parts to connect the several members one to the other.

9. In an electrical apparatus, a stator comprising a plurality of laminæ, each lamina having a plurality of pairs of opposed peripheral seats, the corresponding seats of the several laminæ being in line one with the other, a plurality of locking members extending circumferentially of said stator, each locking member having its ends arranged transversely to the peripheral edges of said laminæ and engaging the respective seats of one pair of seats, and members other than said circumferential members extending between and secured to adjacent locking members the last mentioned members having parts engaging said laminæ to hold the latter in firm engagement one with the other.

10. In an electrical apparatus, a stator comprising a plurality of laminæ, each lamina having a plurality of pairs of opposed peripheral seats, the corresponding seats of the several laminæ being in line one with the other, a plurality of locking members extending circumferentially of said stator, each locking member having its ends arranged transversely to the peripheral edges of said laminæ and engaged with the respective seats of one pair of seats and having parts projecting beyond the respective outermost laminæ and side members secured to said parts of said locking members and engaging the outermost laminæ.

11. In an electrical apparatus, a stator comprising a plurality of laminæ, a plurality of locking members extending circumferentially of said stator, each locking member having opposite edges extending transversely to and connected with the peripheral edges of the several laminæ, and a plurality of members arranged at each side of said stator, each of said side members being firmly secured to two of said locking members.

12. In an electrical apparatus, a stator comprising a plurality of laminæ, each lamina having a plurality of pairs of opposed peripheral seats, the corresponding seats of the several laminæ being in line one with the other, a plurality of locking members extending circumferentially of said stator, each locking member having its ends arranged transversely to the peripheral edges of said laminæ and engaged with the respective seats of one pair of seats, and a plurality of members on each side of said stator, each of said side members extending between two of said locking members and being secured to the adjacent ends of said locking members.

13. In an electrical apparatus, a stator comprising a plurality of laminæ, each lamina having a plurality of pairs of opposed peripheral seats, the corresponding seats of the several laminæ being in line one with the other, a plurality of locking members extending circumferentially of said stator, each locking member having its ends arranged transversely to the peripheral edges of said laminæ and engaged with the respective seats of one pair of seats, and a plurality of members on each side of said stator, each of said side members being arranged between adjacent locking members and said locking members and said side members having interengaging parts to connect the same one to the other.

14. In an electrical apparatus, a stator comprising a plurality of laminæ, each lamina having a plurality of pairs of opposed peripheral seats, the corresponding seats of the several laminæ being in line one with the other, a plurality of locking members extending circumferentially of said stator, each locking member having its ends arranged transversely to the peripheral edges of said laminæ and engaged with the respective seats of one pair of seats and having near each end thereof parts projecting beyond the outermost laminæ at the respective sides of said stator, and a plurality of members on each side of said stator, each of said side members extending between adjacent locking members and having openings to receive said parts of said adjacent locking members.

15. In an electrical apparatus, a stator comprising a plurality of laminæ, each lamina having a plurality of pairs of opposed peripheral seats, the corresponding seats of the several laminæ being in line one with the other, a plurality of locking members extending circumferentially of said stator, each locking member having its ends arranged transversely to the peripheral edges of said laminæ and engaged with the respective seats of one pair of seats, and a plurality of members spaced about the outermost laminæ at each side of said stator, each side member extending between two adjacent locking members and having an opening near each end thereof, said locking members having lugs extending through the respective side members and upset to rigidly connect said side members with the respective locking members.

16. In an electrical apparatus, a stator comprising a plurality of laminæ each having a plurality of pairs of opposed notches in the edge thereof, the corresponding notches of the several laminæ being alined to form a continuous recess, a plurality of plates spaced circumferentially about said laminæ and each having its ends seated in the respective recesses of one pair of recesses, and a plurality of side plates on each side of said stator, each side plate being connected with two of said circumferential plates.

17. In an electrical apparatus, a stator comprising a plurality of laminæ each having a plurality of pairs of opposed notches in the edge thereof, the corresponding notches of the several laminæ being alined to form a continuous recess, a plurality of plates spaced circumferentially about said laminæ and each having its ends seated in the respective recesses of one pair of recesses, and a plurality of side plates, on each side of said stator, each side plate extending between adjacent circumferential plates and having an opening near each end thereof and said circumferential plates having rivet lugs extending through the openings in the respective side plates and upset to connect said plates one to the other.

18. In an electrical apparatus, a stator comprising a plurality of laminæ each having a plurality of pairs of opposed notches in the edge thereof, the corresponding notches of the several laminæ being alined to form a continuous recess, a plurality of plates spaced circumferentially about said laminæ and each having its ends seated in the respective recesses of one pair of recesses, and having its intermediate portion spaced from the edges of said laminæ, and a plurality of side plates on each side of said stator, each side plate being arranged between and connected to the adjacent ends of two circumferential plates.

19. In an electrical apparatus, a stator comprising a plurality of laminæ, each lamina having a series of peripheral projections spaced about the circumference thereof, the corresponding projections of the several laminæ being arranged in alinement and each projection having a notch in each end thereof, plates extending between adjacent groups of projections, each having its ends seated in the notches in the adjacent groups of projections, side plates engaging the respective projections of the outermost lamina at each side of said stator, and means for connecting each side plate with two of the first mentioned plates.

20. In an electrical apparatus, a stator comprising a plurality of laminæ, each lamina having a series of peripheral projections spaced about the circumference thereof, the corresponding projections of the several laminæ being arranged in alinement and each projection having an inwardly sloping notch in each end thereof, plates extending between adjacent groups of projections, each plate having its ends sloping inwardly and seated in the notches in said adjacent groups of projections, side plates engaging the respective projections of the outermost lamina at each side of said stator, and means for connecting each side plate with two of the first mentioned plates.

21. In an electrical apparatus, a stator comprising a plurality of laminæ, each lamina having a series of peripheral projections spaced about the circumference thereof, the corresponding projections of the several laminæ being arranged in alinement and each projection having a notch in each end thereof, curved plates extending between adjacent groups of projections, each plate having its ends seated in the notches in said adjacent groups of projections, the intermediate portions of said plates being spaced from the edges of said laminæ, side plates engaging the respective projections of the outermost lamina at each side of said stator, and means for connecting each side plate with two of the first mentioned plates.

22. In an electrical apparatus including a stator, and end frames arranged at the opposite sides of and rigidly secured to said stator, said stator comprising a plurality of laminæ, a plurality of locking members arranged circumferentially of said stator and each having its opposite ends extending transversely to and rigidly connected with the peripheral edges of said laminæ, said locking members having lateral edges adjacent to the sides of said stator and provided with grooves to receive the edge portions of the respective end frames.

23. In an electrical apparatus including a stator, and end frames arranged at opposite sides of and rigidly secured to said stator, each end frame having an inwardly extending portion to engage said stator, said stator comprising a plurality of laminæ, a plurality of locking plates arranged circumferentially of said stator and each having its opposite ends extending across and engaging the peripheral edges of said laminæ, and means to rigidly secure said locking plates to said laminæ, said locking plates having their lateral edge portions grooved to receive the inner edge portions of the respective end frames.

24. In an electrical apparatus including a stator, and end frames arranged at opposite sides of and rigidly secured to said stator, each end frame having an inwardly extending portion to engage said stator, said stator comprising a plurality of laminæ, a plurality of locking plates arranged circumferentially of said stator and each having its opposite ends extending across and engaging the peripheral edges of said laminæ, and a plurality of side plates arranged at each side of said stator and each rigidly connected with two of said locking plates, said locking plates and said side plates having their edge portions grooved to receive the inner edge portions of said end frames.

25. In an electrical apparatus, a stator comprising a plurality of laminæ each having a plurality of pairs of oppositely inclined notches in the edge thereof, the notches of each pair facing each other and the corresponding notches in the several laminæ being alined transversely to the stator to form a continuous recess, a plurality of plates spaced circumferentially about said laminæ and each having its ends seated in the respective inclined recesses of one pair of recesses, and means at each side of said stator for holding said plates against movement with relation to said laminæ.

GEORGE H. LELAND.